Figure 1:
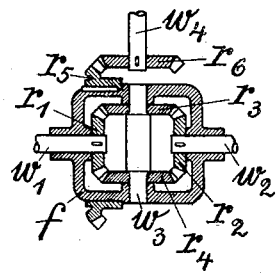

E. MECKELBURG.
MEANS FOR REGULATING THE SPEED OF PRIME MOVERS AND MOTORS.
APPLICATION FILED AUG. 25, 1908.

922,175.

Patented May 18, 1909.

5 SHEETS—SHEET 1.

E. MECKELBURG.
MEANS FOR REGULATING THE SPEED OF PRIME MOVERS AND MOTORS.
APPLICATION FILED AUG. 25, 1908.

922,175.  Patented May 18, 1909.

Witnesses
H. H. Knight
H. O. Jenks

Inventor
Eduard Meckelburg

E. MECKELBURG.
MEANS FOR REGULATING THE SPEED OF PRIME MOVERS AND MOTORS.
APPLICATION FILED AUG. 25, 1908.

922,175.

Patented May 18, 1909.
5 SHEETS—SHEET 4.

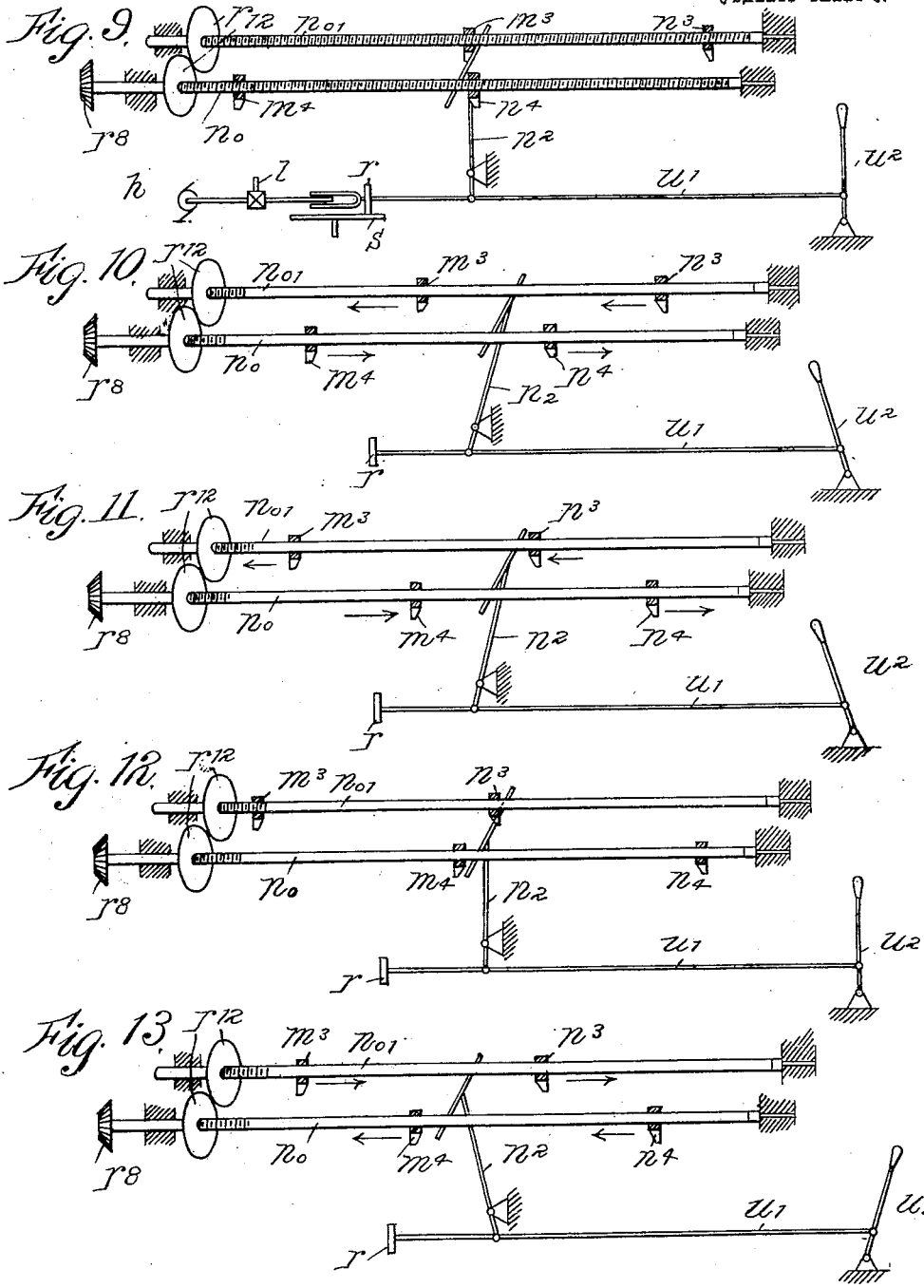

UNITED STATES PATENT OFFICE.

EDUARD MECKELBURG, OF CHARLOTTENBURG, GERMANY, ASSIGNOR TO SIEMENS-SCHUCKERT-WERKE G. M. B. H., OF BERLIN, GERMANY, A CORPORATION OF GERMANY.

MEANS FOR REGULATING THE SPEED OF PRIME MOVERS AND MOTORS.

No. 922,175.   Specification of Letters Patent.   Patented May 18, 1909.

Application filed August 25, 1908. Serial No. 450,194.

*To all whom it may concern:*

Be it known that I, EDUARD MECKELBURG, a subject of the German Emperor, and residing at Charlottenburg, near Berlin, Germany, have invented certain new and useful Improvements in Means for Regulating the Speeds of Prime Movers and Motors, of which the following is a specification.

The present invention relates to prime movers and motors, and its object is to provide an improved method and means for regulating the speed of the same.

When prime movers and motors have to operate in cycles and in each cycle at a certain required speed, as is the case, for example, in operating hoisting engines, elevator-motors and the like, it is desirable that the prime mover or motor itself should positively control the speed, in order that it may be independent of the skill of the operator and of contingencies which influence his actions. For some years this method has been employed in the case of machines driven electrically by means of the Leonard connection, and particularly in the case of hoisting machines and elevators, very favorable results have been obtained, particularly in point of increased efficiency and reliability of operation compared with other methods of operation, owing to the reliability of the controlling means. This method, however, was heretofore limited to the electrical machines connected according to the Leonard arrangement, since all the other electrical machines which might be considered for this purpose, or any other kind of prime movers and motors particularly adapted for hoisting work, have the great disadvantage when used for producing a required speed-curve under different load conditions that they require a different manner of operating the controlling means for each particular case according to the load. For this reason, in case of heavy machines which have to operate periodically and particularly in plants of very large power, the Leonard connection has in most instances excelled other methods of driving. Direct electrical driving is seldom employed, and also in many instances steam engines cannot be employed directly, because in this case other contingencies arise, in so far as the valve-motion of the engine cannot be controlled independently of the cycle of operation.

By the method and means described hereafter, I am enabled to control prime movers and motors of all kinds, even those the speed of which depends not only upon the movement of their controlling lever but also upon their load at any time, broadly speaking upon the conditions under which they are to operate positively and with perfect certainty as required by the cycle of operation, for example in the case of a hoisting motor according to the position of the depth indicator. Instead of the latter any other measuring devices may be employed which operate relatively to the cycle of operations, such as, for instance, means for recording the distance traversed, the work performed, the speed or time, as for example, an ammeter, voltmeter, dynamometer, speed-indicator, manometer, time-switch, float, and cut-out and the like. Moreover, the method and device herein described may also be used for removing small defects of the machines driven electrically by means of the Leonard connection, which consist in small deviations from the speed required according to the depth indicator, which may be observed more or less distinct in the machines according to the degree of load variation and according to the drop in tension varying with the load.

In the following description the method according to my invention will be explained with reference to hoisting plants in which the speed of the motor is controlled, for instance, by the movement of the carrier of the depth indicator. As already stated above, the hoisting engine or motor itself may be of any suitable kind. In the accompanying drawings an electric motor has been selected as an example, and I shall call this motor hereinafter the hoisting motor, without thereby limiting the use of the system to the particular function of hoisting.

The method, according to the invention, consists substantially in having the depth indicator driven by the hoisting motor not acting directly upon the controlling means of the motor, as is the case in motors connected according to the Leonard arrangement, but acting through one of the well-known variable transmission gears driven by an auxiliary motor running at an approximately constant speed. Owing to this gear being varied by the depth indicator, the constant speed of the auxiliary motor transmitted through this gear is varied in the desired manner and degree and used in the following manner as controlling speed for controlling the speed of the hoisting motor; the part of the variable transmission gear which moves at this controlling speed is suitably connected (for instance, by a gear or other well-known means) with the hoisting motor so that when the speed of the hoisting motor varies from the controlling speed, the controlling means of the hoisting motor is actuated in the desired manner until the speed of the hoisting motor again exactly corresponds with the controlling speed.

In order to produce the variable controlling speed from a constant speed, in accordance with the invention any variable transmission means or gear may be used, for example a disk transmission, conical belt-pulleys, and the like. Since most of those gears work unreliably at very low speeds, and inasmuch as it is particularly desirable to also control the motor equally as certain at low speed, it is preferable to use a differential gear for producing the controlling speed. In this instance the primary elements $r_1$, $r_2$ of the differential gear, which will be hereafter more fully explained with reference to Figure 1 of the drawings, must either each be driven at the same time from the constant speed motor at variable speeds, so that the secondary element $r_5$ will run at the resulting speed, which is called hereafter the controlling speed, or it may be sufficient to run only one of the prmary elements at variable speed and the other at the constant speed directly from the auxiliary motor with a similar result regarding the controlling speed of the secondary element. This controlling speed may be of course also produced by connecting one of the primary elements of the gear to the constant speed source and the above mentioned secondary element to the variable speed source and derive the controlling speed from the other above mentioned primary member provided the three members are properly geared relatively to each other without departing from the spirit of my invention. The alternative use of the three above elements of such gears for equalizing purposes is well-known in the art and the manner of connecting these gears shown and described by me is only shown as the manner which I prefer for my purposes. The element which is moved at the controlling speed is likewise preferably connected by a differential gear with the hoisting motor, which gear is to be connected in such manner with the regulating apparatus of the hoisting motor, or with the means which move the regulating apparatus, that the power which drives the motor is increased as soon as the hoisting motor lags behind the controlling speed; vice versa, the propelling agent must be throttled when the motor leads the controlling speed. The differential gear which connects the two primary shafts may be constructed in any of the known forms, for example, as bevel-wheel, spur, or spindle differential-gear; or both the primary shafts, the speeds of which are to be equalized, may carry stops or shoulders, by means of which the controlling means of the motor is influenced directly, or through the intermediary of an auxiliary force, after a certain phase difference in the running of the shafts has occurred,—that is to say when the one shaft has moved a certain angle relatively to the other.

In order that the invention may be clearly understood, reference will be made to the accompanying drawings, in which a number of modifications embodying the invention are shown diagrammatically, by which the method according to the invention may be carried into effect.

Figure 2:
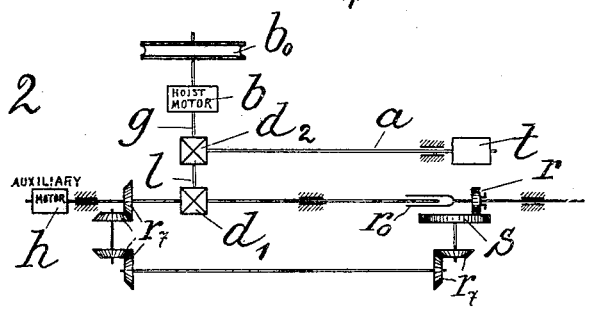
Figure 3:
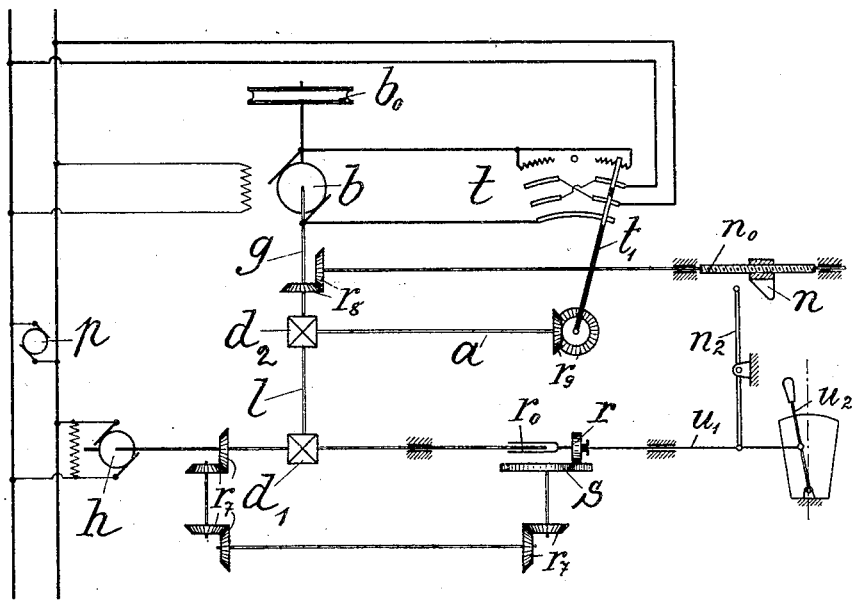
Figure 4:
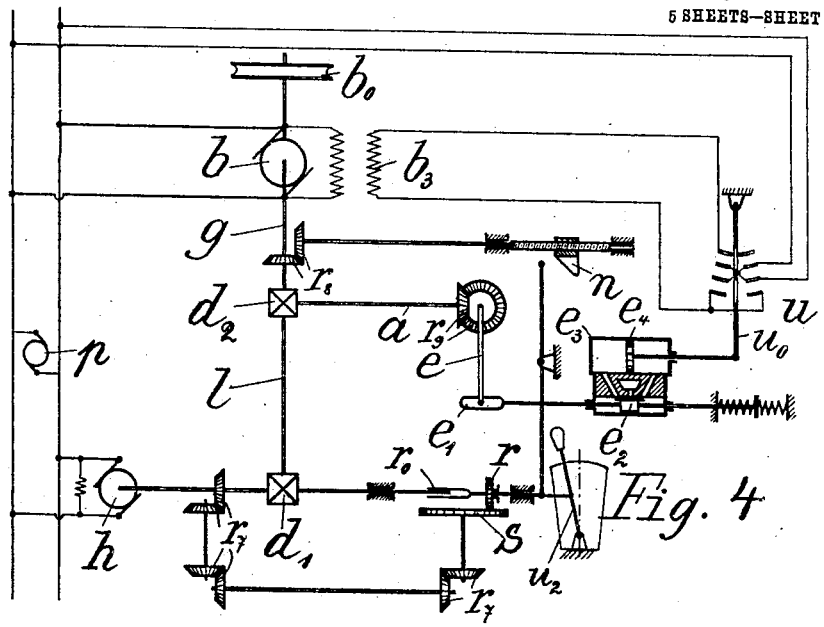
Figure 5:
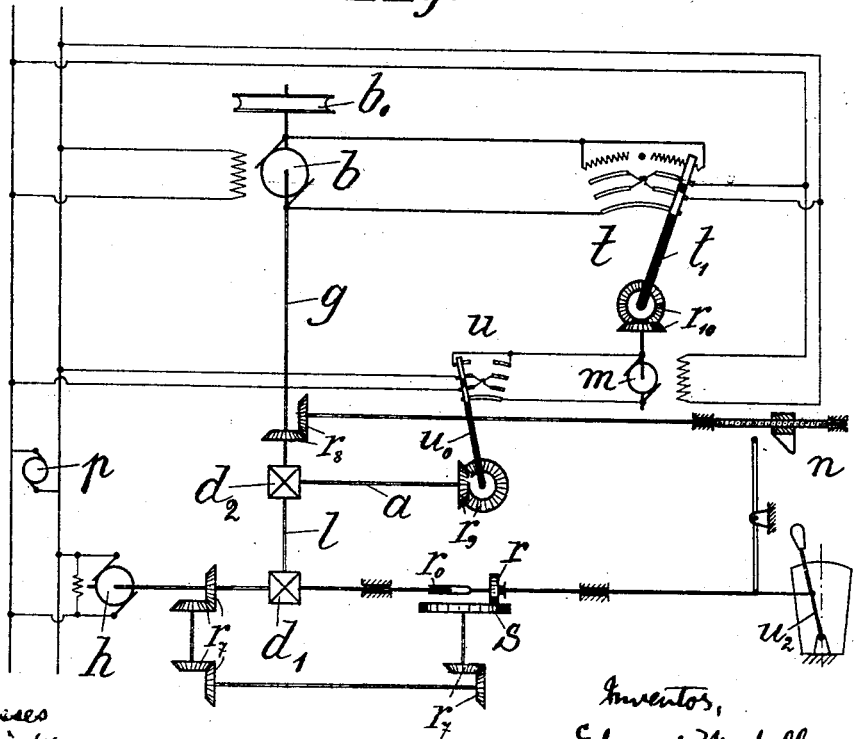
Figure 6:
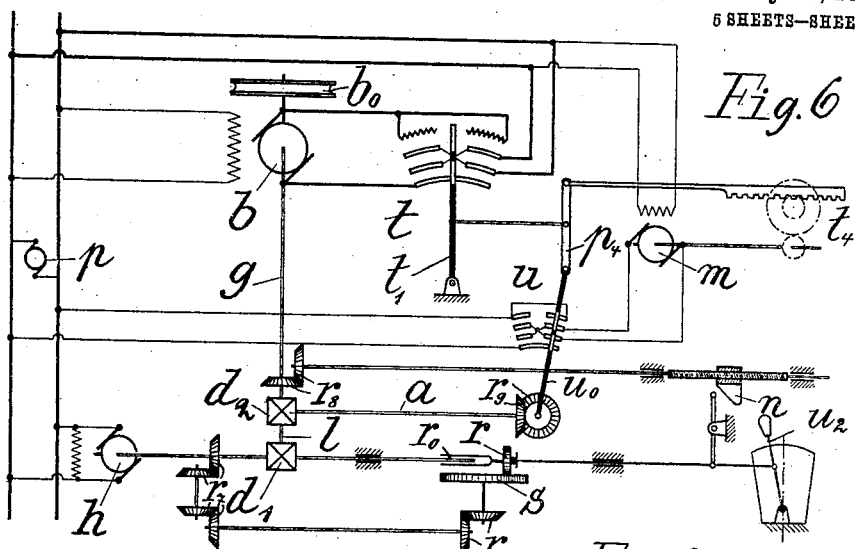
Figure 7:
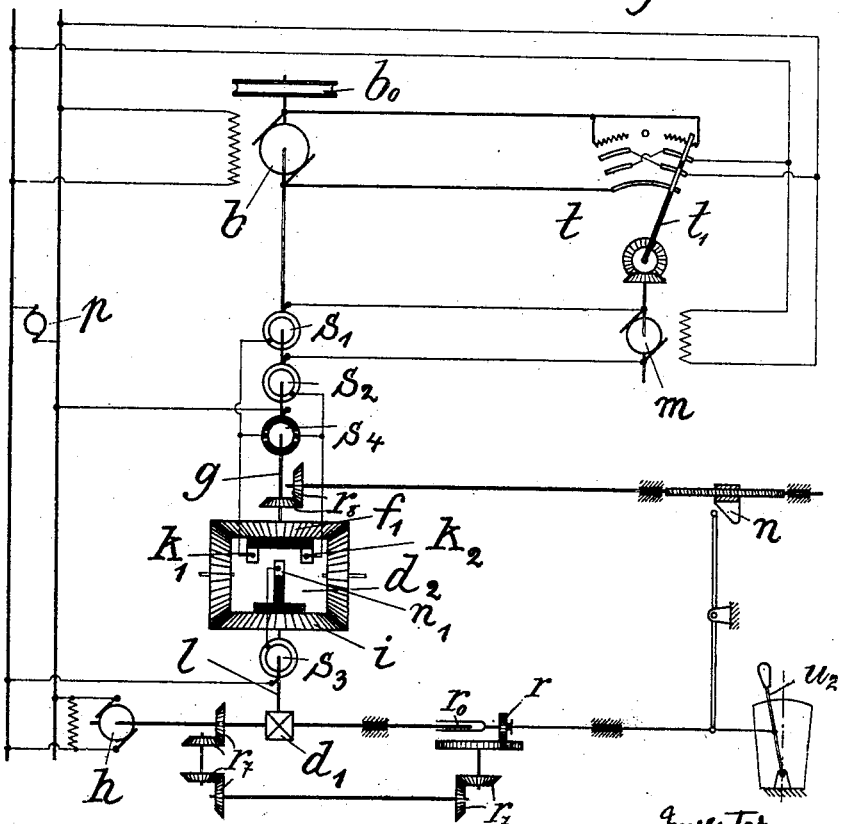
Figure 8:
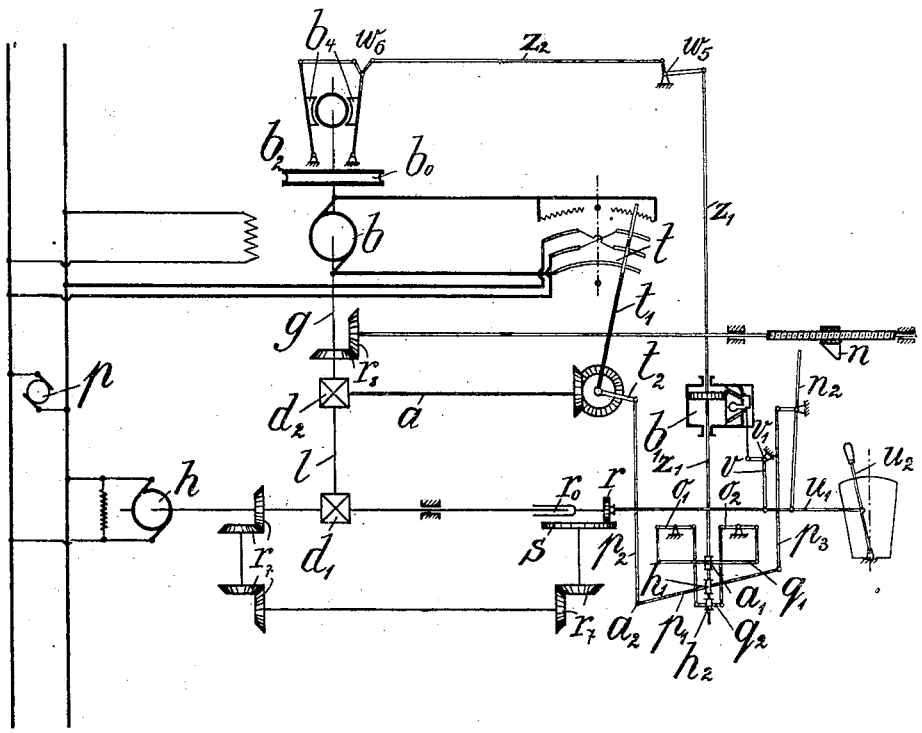

In these diagrams: Fig. 1 is a plan view of a bevel-wheel differential gear, partly in section; Fig. 2 shows diagrammatically one arrangement of means for regulation according to the invention; Fig. 3 shows a modification of regulating means in which the motor shaft and controlling shaft are to run in synchronism; Fig. 4 shows a modified form, in which the motor shaft and controlling shaft are to run in synchronism and in phase; Fig. 5 shows a modification of the form according to Fig. 4, means being provided for making the regulation produced more gradual; Fig. 6 is a combination of the forms shown in Figs. 3 and 5; Fig. 7 is a modification of the form shown in Fig. 5, whereas Fig. 8 shows an arrangement corresponding to that in Fig. 3, a safety device being employed here. Figs. 9, 10, 11, 12, and 13 are diagrammatical illustrations of various positions of the depth indicator and of the manner in which it may control the controlling speed at predetermined points of the hoist.

Referring to the drawings, in Fig. 1 a bevel-wheel differential gear such as may be employed in combination with other means according to the invention is represented. The bevel wheel $r_1$, which I shall call one of the primary elements, is fixed on the shaft $w_1$, and the bevel wheel $r_2$, the other primary element, is fixed on the shaft $w_2$, whereas the two bevel-wheels $r_3$ and $r_4$ are loose on the shaft $w_3$. The latter is connected with the casing or box $f$ which is rotatably disposed on the shafts $w_1$ and $w_2$. On the casing $f$ and integral with or rigidly fastened to the same is provided bevel-wheel $r_5$, forming with casing $f$ the secondary element, which meshes with the bevel-wheel $r_6$ on the shaft $w_4$. The action of this gear is as follows: If the primary shafts $w_1$ and $w_2$ are driven at equal speed but in opposite directions, the bevel-wheels $r_3$ and $r_4$ rotate on their common axis, but the shaft $w_3$ and casing $f$ connected with it remain stationary. When the shafts $w_1$ and $w_2$ have a different relative movement—that is to say, if they rotate at different speeds—the shaft $w_3$ is moved angularly and the casing $f$ rotates in its bearings on the shafts $w_1$ and $w_2$ at the resulting speed. When shafts $w_1$ and $w_2$ rotate in the same direction, casing or box $f$ will rotate with shafts $w_1$ and $w_2$ at the same speed and in the same direction. Now the rotation of the casing is imparted by means of the bevel-wheels $r_5$ and $r_6$ to the shaft $w_4$. Consequently the latter rotates at a speed which depends on the direction of rotation and the speed of shafts $w_1$ and $w_2$.

Fig. 2 shows a simple arrangement of regulating means according to my invention. The differential gear shown in detail in Fig. 1 is here and in Figs. 3 to 8 represented diagrammatically by squares denominated $d_1$ and $d_2$. The auxiliary prime mover or motor $h$, the speed of which is kept constant, drives one primary element of the differential gear $d_1$ directly and also drives the friction disk $s$ by means of any suitable gearing, bevel-wheels $r_7$ being shown in the drawing as an example. With friction disk $s$ coöperates the friction wheel $r$ which may be shifted radially relatively to friction disk $r$, and thus regulated in speed according to the operation of the prime mover or hoisting motor $b$ which is to be controlled by means not shown in Fig. 2. The wheel $r$ is also connected with and drives the other primary element of the differential gear $d_1$ through the coupling $r_0$. Now by means of the differential gear, from the speeds of the auxiliary motor $h$ and the friction disk $s$ the secondary speed of the shaft $l$ results which will hereafter be called the controlling speed. The shaft $l$ is connected with the shaft $g$ of the hoisting engine or motor $b$ by the differential gear $d_2$, of which the two shafts form the primary elements, and the secondary shaft $a$ of the latter moves the controlling apparatus $t$ of the hoisting motor $b$ or the controller of an auxiliary motor which operates the controlling means of the prime mover or motor $b$. With the latter is coupled the pulley $b_0$ of the hoisting machine.

In accordance with the invention the speed of the prime mover or hoisting motor $b$ can be controlled in two fundamentally different ways. First: the supply of energy to the hoisting motor alone may be increased or decreased until the speed of the motor agrees perfectly with the controlling speed, when the two shafts $l$ and $g$ will again run synchronously, or, second: The control may be such that the shafts $l$ and $g$ run not only at equal speeds but also in step, that is to say, if, for instance, the motor shaft $g$ should commence to lag in speed behind the shaft $l$ rotating at the controlling speed, the manner of regulation then actuated by shaft $a$ is such that the motor with shaft $g$ is not only prevented from further lagging and caused to run again at the controlling speed, with shaft $g$ now shifted at a certain angle relatively to shaft $l$, but the motor is also caused to restore the normal relative angular position of shafts $g$ and $l$, which they had before the lagging in speed occurred,—in other words, the motor through the manner of regulation will also make up for the angle it lagged behind shaft $l$ until the regulating means came into action. In this manner it is obtained that the controlling shaft and the motor shaft not only run synchronously, but also in like phase.

In Figs. 3 to 8 several different manners of reducing the method above described to practice are represented diagrammatically.

Fig. 3 shows an arrangement in which the controlling shaft $l$ and the motor shaft $g$ are to run synchronously, regardless of the phases of the two shafts. In this arrangement the supply of energy to the hoisting motor is varied the more the speeds of the two shafts $l$ and $g$ differ from one another. The carrier $n$ of the depth indicator is moved by means of the screw-spindle $n_0$ and the bevel-wheels $r_8$ by the shaft $g$ of the hoisting motor $b$, and the friction wheel $r$ is shifted on the friction disk $s$ by the carrier $n$ by means of lever system $n_2$, $u_1$. In this manner the controlling speed is varied in the manner required by the depth indicator. The lever $t_1$ of the controller $t$ of the hoisting motor $b$ is connected by bevel-wheels $r_9$ with the shaft $a$ of the differential gear $d_2$. If the shaft $a$ is at rest when the speeds of the shafts $g$ and $l$ are equal, the lever $t_1$ of the controller $t$ is also at rest. It is moved and regulates the speed of the hoisting motor within wide limits, however, when the shaft $a$ rotates owing to the difference in speed between shafts $g$ and $l$. The gearing of disk $s$ and friction wheel $r$ and auxiliary motor $h$ through differential gear $d_1$ is chosen so that when hand lever $u_2$ is in neutral (dotted) position, auxiliary motor $h$ and friction wheel $r$ will revolve at equal speed, but in opposite direction, so that shaft $l$ will be at rest and thus cause differential gear $d_2$ to revolve shaft $a$ until lever $t_1$ arrives at the neutral (middle) position of the controller in case the motor $b$ and shaft $g$ should still revolve, so that thereby the current is cut off and the motor will stop. If now, the operator desires to start the elevator car for instance upward, which might in the present example correspond with a movement of the carrier $n$ from the right to the left, he throws lever $n_2$ into the position shown in Fig. 3. This will change the gearing of friction wheel $r$ and disk $s$ so that shaft $l$ will commence to rotate in the direction corresponding therewith. Since arm $t_1$ is still in the neutral position, motor $b$ has not commenced to operate yet and therefore differential gear $d_2$ will cause shaft $a$ to rotate in the corresponding direction so that arm $t_1$ will commence to move to the right and thus start the motor. Arm $t_1$ will continue to move to the right and tend to increase the speed of the motor $b$ until the latter, with its shaft $g$ and shaft $l$ are in synchronism, whereupon shaft $a$ ceases to revolve and arm $t_1$ will be at rest in the proper position corresponding with the desired speed of the motor. During the hoisting, however, the weight of the hoisting cable to be lifted with the car decreases constantly. Therefore motor $b$ will unduly increase its speed. The difference in speed of shafts $g$ and $l$ causes shaft $a$ to now rotate in the opposite direction which in turn will shift arm $t_1$ toward neutral position until the motor is thus slowed down sufficiently to again run in synchronism with the controlling speed. Whenever desired to stop the car, the operator throws the lever $u_2$ back into the dotted neutral position whereupon shaft $l$ ceases to revolve and causes arm $t_1$ to move into the neutral position and to stop the motor as above described.

While it does not pertain to the subject matter of the present invention, I shall now shortly describe as an example how the controlling speed may be influenced by the depth indicator. Figs. 3 to 8 merely represent the depth indicator by a spindle $n_0$ and a carrier $n$ adapted to abut at a given time, against lever $n_2$, which is meant to indicate that there may be means provided by which the controlling speed can be changed automatically and independent of the operator. Figs. 9 to 13 now illustrate more detailed though also only diagrammatically how the depth indicator may at times control the shifting of friction wheel $r$ to prevent the operator at such times from moving hand lever $u_2$ otherwise than required. Figs. 9 to 13 illustrate the particular case in which the operator should be prevented from swinging his hand lever at the beginning of the hoist too far out of the neutral position and thus from starting the hoisting motor too fast, which might result in injury to the latter. This case also illustrates how the depth indicator may reset the hand lever gradually to the neutral position at the end of the hoist if the operator fails to do so, and how it will permit the operator to then start the hoisting motor only in the opposite direction and only gradually at the beginning as mentioned above. For this purpose, I provide in addition to spindle $n_0$ driven by bevel gear $r_8$ a spindle $n_{01}$ in parallel thereto which is driven from spindle $n_0$ through spur gears $r_{12}$ at the same speed but in opposite direction. On spindle $n_{01}$ are disposed carriers $m_3$ and $n_3$ and on spindle $n_0$ carriers $m_4$ and $n_4$, the distance between the carriers on each spindle representing the total lift of the hoisting machine. If now bevel gear $r_8$ operates spindle $n_0$, carriers $m_3$ and $n_3$ will travel at a fixed distance from each other in one direction, while carriers $m_4$ and $n_4$ travel at a fixed distance in opposite directions. The upper end of lever $n_2$ is now so disposed relatively to the carriers of the two spindles, that if hand lever $u_2$ is in neutral position as shown in Fig. 9, lever $n_2$ will be held between carriers $m_3$ and $n_4$ so that it has only enough play between them, to allow a slight motion of hand lever $u_2$ to the left, which is sufficient to just cause the starting of the hoisting motor. The motor now being in motion will operate spindles $n_0$ and $n_{01}$ and thus cause carriers $m_3$ and $n_4$ to travel in the direction shown by the arrows in Fig. 10, which in turn will gradually release the upper end of lever $n_2$ so that the operator is now able to gradually throw the hand lever to its full limit to the left for full speed as indicated in Fig. 11. Now the operator has full control over the hand lever and for instance in case of emergency may throw it back to neutral or even reverse it, without interference of any carrier. Shortly before the end of the lift in the direction described above carrier $n_3$ will approach the upper end of lever $n_2$ as shown in Fig. 11 and will gradually shift it together with hand lever $u_2$ back to neutral and thus cause the motor to stop. In the mean time, carrier $m_4$ has approached lever $n_2$ from the other side sufficiently to prevent the operator from throwing hand lever $u_2$ unduly far to the right, allowing, however, enough play for throwing it a short distance to the right in order to start if desired, the motor in the opposite direction, as illustrated in Fig. 12. When the motor is under way all the carriers will now travel in the direction indicated by the arrows in Fig. 13 and carriers $m_4$ and $n_3$ will gradually release lever $n_2$ to enable the operator to gradually throw lever $u_2$ farther to the right for full speed. In the position of carriers $m_4$ and $n_3$ shown in Fig. 12 the operator is only able to throw the hand lever a short distance to the right and is prevented by carrier $n_3$ from throwing it any distance at all to the left so that he is unable to start the motor by mistake in the same direction in which it had been stopped. In a similar manner in the position of carriers $m_3$ and $n_4$ in Fig. 9, the operator can move the hand lever only gradually to the left and not to the right. Thus the depth indicator controls the controlling speed of the motor at the beginning and at the end of the operation of the hoisting machine while during the intermediate period the controlling speed may be regulated by the operator at will. In this modification and in those described hereafter, the auxiliary prime mover or motor $h$ which actuates the differential gear $d_1$ is shown, for example, as a constant speed electric motor driven from the generator $p$.

Whereas the arrangement according to Fig. 3 only enables the speed of the hoisting motor to be synchronized with the speed of the controlling shaft, the arrangement according to Fig. 4 affords not only this, but also equalizes differences in phase between the shafts $l$ and $g$ which occur during the regulating operations as explained above. For this purpose, when a certain difference of phase exists between the shafts, the means for controlling the hoisting motor is suddenly influenced to such an extent that the difference of phase disappears again at once. When the shaft $a$ and the lever $e$ connected with it by bevel wheels $r_9$ have rotated a certain distance, the free end of lever $e$ then being located either at one or the other end of a slot in head $e_1$ moves the slide valve $e_2$ of a compressed-air cylinder $e_3$, by the piston $e_4$ of which the lever $u_0$ of a reverse switch $u$ is moved, which, for example, may suddenly act upon the current in the field winding $b_3$ of the hoisting motor $b$. The result of this strong impulse is that the speed of the motor $b$ now differs from the speed of the controlling shaft in a sense opposite to that in which it differed before; the motor is thus over-regulated. Then, however, the controlling means comes into action at once in the opposite sense. The process of regulation therefore is such that the speed of the motor fluctuates continuously above and below the speed of the controlling shaft. Since the amplitude of this fluctuation may be reduced to any suitable amount, however, the speed of the hoisting motor which is to be governed will be practically synchronous and in phase with the controlling speed. In order to lessen the impulse with which the over-regulation of the motor takes place, this arrangement may be modified so that when a certain inadmissible difference of phase occurs, the controlling means is at first influenced only slightly, and that this adjustment is increased more and more, however, the longer an inadmissible difference of phase exists. Fig. 5 shows one form of such an arrangement. The lever $u_0$ of a reverse switch $u$ of the auxiliary motor $m$ is moved by means of bevel-wheels $r_9$ by the shaft $a$. When the switch lever is moved only a short distance from the central or zero position, the motor $m$ remains cut out of circuit. But as soon as the displacement of the switch lever from the zero position exceeds a certain amount the motor $m$ is connected in circuit in the one or other direction, so that it moves the lever $t_1$ of the controller $t$ by means of the bevel-wheels $r_{10}$ and thereby regulates the speed of the hoisting motor $b$ in suitable steps.

The two methods of regulation described above with reference to Figs. 3 and 4 may also be combined with each other, for example, by the controller of the motor $b$ which is moved the more, the greater the difference in phase is between the two shafts (Fig. 3), and which besides may be strongly influenced suddenly (Fig. 4) or gradually and increasingly (Fig. 5) when a certain difference of phase occurs and according to its degree and the time during which it occurs. The controller is allowed to be influenced according to Fig. 4 or Fig. 5 so long as a predetermined inadmissible difference of phase still exists. In Fig. 6 such an arrangement is represented as a combination of the modifications shown in Fig. 3 and Fig. 5. The lever $u_0$ of the switch $u$ driven by means of bevel-wheels $r_9$ from the shaft $a$ throws into circuit the auxiliary motor $m$ in the one or other direction when the difference of phase of the shafts $l$ and $g$ reaches a certain amount. The motor $m$ slowly actuates the lever $t_1$ of the controlling apparatus $t$ of the hoisting motor $b$ by means of a suitable transmission gear $t_4$, but not directly, however, but by means of a swinging bar $p_4$ to which is attached the switch lever $u_0$ of the reverse switch $u$. When a great difference of phase arises the controller $t$ is rapidly moved a great distance by the switch-lever $u_0$ of the switch $u$, but at the same time the auxiliary motor $m$ is connected in circuit and moves the controller $t$ until the difference of phase between the shafts $g$ and $l$ has become zero or until it has reached a permissible amount. Consequently by means of this arrangement the hoisting motor, practically speaking, may be caused to run synchronously and in phase with the shaft $g$ without the speed of the motor fluctuating above and below the controlling speed.

In the arrangements which admit of over-regulation, as, for example, the arrangement according to Fig. 4, any known damping means may of course be employed in order to prevent too violent over-regulation or for neutralizing the other features of the fluctuation of the regulating operation which may be termed as resonance effects.

Instead of moving the lever $u_0$ of the reverse switch $u$ for the auxiliary motor $m$ from the shaft $a$ of the differential gear, the auxiliary motor may also be thrown into circuit and reversed directly by the shafts $l$ and $g$ which are to be maintained running at constant speed. Fig. 7 represents one example for such a connection which otherwise corresponds with the arrangement according to Fig. 5. The shaft $g$ here carries at the bevel-wheel $f_1$ of the differential gear $d_2$ a contact-disk provided with two diametrically opposite contacts $k_1$ and $k_2$ which are connected with the auxiliary motor $m$ through the slip rings $s_1$ and $s_2$. One pole of the source of current $p$ is connected with a slip ring $s_3$ which in turn is connected with the contact pin $n_1$ on the bevel-wheel $i$ mounted on the shaft $l$, whereas the other pole of the source of current $p$ is connected with a slip ring $s_4$ having two segments, each of which is connected with one of the slip rings $s_1$ and $s_2$. Now if the shaft $l$ should rotate relatively to the shaft $g$, the pin $n_1$ will contact with the contact $k_1$ or $k_2$ and thus connect in circuit the auxiliary motor $m$ in the one or other direction until the shafts $l$ and $g$ run synchronously and in like phase again.

As already mentioned above, the controlling speed, according to which the speed of the prime mover or hoisting motor is governed, may be derived from a shaft which is driven at constant speed by any suitable power. For example, the shaft may be driven by a steam or water turbine, an electric motor, or the like, but preferably by an auxiliary motor which is supplied by the same power transmission system to which the prime mover or motor which is to be controlled is connected. Moreover, the auxiliary motor for producing the variable controlling speed is to best advantage of ample power or provided with fly-wheels, in order to offset the tendency of speed variation of the auxiliary motor which arises from the reaction caused by controlling the prime mover or hoisting motor.

Now in practically using the above described method it may happen that the lever $t_1$ of the controller $t$ still remains in one of its extreme positions when the speed of the hoisting motor is zero and consequently when the reversing lever $u_2$ and the friction disk $r$ are already in the zero position. Namely, as soon as the cage is loaded, when the hoisting motor stops at any place it must always continue to exert a certain torque in order to counterbalance the load. With the motor-current necessary for this torque there corresponds a position of the controller lever $t_1$ which deviates more or less from the zero position according to the load of the cage in each instance. Now when the hoisting motor is allowed to start again at the beginning of a new run, it may happen that the motor receives a very strong current, since the lever of the controller $t$ was already moved somewhat from the zero position. Consequently rushes of current or strong electric fluctuations in the system to which the hoisting motor is connected, or also mechanical impulses in the hoisting motor itself will occur which may cause injuries to the plant. In order to avoid these impulses, the arrangement according to the present invention is such that the controller lever $t$ is automatically returned into its normal position when the reversing lever $u_2$ is brought into the zero position. When the motor is hoisting, the controller lever is preferably returned into its zero position by applying the brakes which takes place automatically in known manner when the reversing lever is returned into its normal or zero position.

In Fig. 8 the above described safety device is represented as applied to the arrangement shown in Fig. 3.

When upon loading the cage the reversing lever $u_2$ is brought into its zero position from the position in which it is shown in the drawing either manually or by the depth indicator with the aid of carrier $n$, lever $n_2$ and rod $u_1$, the bell-crank lever $v$, owing to the movement of the rod $u_1$, is rotated on its pivot $v_1$ and the valve of the cylinder $b_1$ is pulled downward, so that compressed air enters above the piston in the cylinder and the piston is pressed downward. Owing to the downward movement of the piston, and by means of the rods $z_1$ and $z_2$ as well as the bell-crank levers $w_5$ and $w_6$, the brake-shoes $b_4$ are pressed against the brake-disk $b_2$ of the shaft $g$ of the hoisting motor $b$ and the shaft $g$ is braked.

Now it is supposed that the lever $t_1$ of the controller $t$ is not in the zero position after the reversing lever $u_2$ has been returned into its zero position, but in the position to the right-hand in which it is shown in the drawing. In order to replace it into the zero position the following arrangement has been devised: The lever $t_1$ has a side arm $t_2$ to which the rod $p_2$ is linked. On the lower part of the rod $z_1$ which passes through the cylinder $b_1$ is slidingly arranged a sleeve $h_1$ which carries the two-armed lever $p_1$, to one end of which the rod $p_2$ and to the other end of which the rod $p_3$ is attached, which for example may be pivotally connected with the bell-crank lever $n_2$ adapted to be moved by the carrier $n$ of the depth indicator. The sleeve $h_1$ is moved on the rod $z_1$ by a replacing device arranged as follows: To the outer ends of the two two-armed levers $o_1$ and $o_2$ is linked the rod $q_1$, which is rigidly connected with the rod $z_1$ at $a_1$, and to the two inner ends of $o_1$ and $o_2$ is linked the rod $q_2$ which is attached to the sleeve $h_2$ slidingly disposed on the rod $z_1$. If the rod $z_1$ which passes through the compressed-air cylinder moves downward, the rod $q_1$ is also moved downward, but the rod $q_2$ is moved upward by the described system of levers. Now the sleeve $h_1$ is pushed upward from the position in which it is shown by the sleeve $h_2$, and the rod $p_1$ is rotated around the pivot $a_2$. But bell-crank lever $n_2$, which in each position of the depth indicator has a certain amount of play for rotating, is also rocked by means of the rod $p_3$ and can shift the friction-disk $r$ slightly on the plate $s$, so that the shaft $l$ of the differential gear $d_1$ rotates and sends the lever $t_1$ of the controller $t$ into it normal position by means of the differential gear $d_2$ and shaft $a$. The rod $p_1$ also rocks into such a position that bell-crank lever $n_2$ is returned again by means of the rod $p_3$ into the position corresponding to the stationary condition of the hoisting motor.

The described arrangement has the advantage that when the hoisting motor is not braked the lever $p_1$ can oscillate freely between the sleeve $h_2$ and the point $a_1$, and also the controller lever $t_1$ can occupy any position, so that the controlling means of the motor $b$ can be handled entirely at will.

Instead of directly replacing the lever $t_1$, an auxiliary motor of suitable kind may be connected in circuit by the means described, and this motor then returns the lever into its normal position.

What I claim as my invention and desire to secure by Letters Patent is:

1. A device for automatically regulating the speed of prime movers and motors according to their working conditions comprising a motor or prime mover to be controlled, means adapted to regulate the speed of said motor, means suitably connected with said motor adapted to produce a controlling speed and suitably connected with said motor regulating means to actuate same as required by said controlling speed, and means for regulating said controlling speed according to the conditions under which said motor is to operate.

2. A device for automatically regulating the speed of prime movers and motors according to their working conditions comprising a motor or prime mover to be controlled and mechanism driven by same, means adapted to regulate the speed of said motor, means suitably connected with said motor adapted to produce a controlling speed and suitably connected with said motor regulating means to actuate same as required by said controlling speed, and means operated by said driven mechanism for regulating said controlling speed as required by said driven mechanism.

3. In means for regulating the speed of prime movers and motors, the combination, with the controlling means of the prime mover or motor, of a variable transmission gear, a shaft driven at approximately constant speed connected with said gear, means for varying said gear according to the condition under which said motor is to operate, a shaft adapted to be driven by said gear, and means driven at a speed depending on the difference in speed between the latter shaft and the shaft of the prime mover or motor, the latter means being adapted to actuate said controlling means of the prime mover or motor.

4. In means for regulating the speed of prime movers and motors, the combination, with the controlling means of the prime mover or motor, of a variable transmission gear, a shaft driven at approximately constant speed connected with said gear, means for varying said gear according to the condition under which said motor is to operate, a shaft adapted to be driven by said gear, a second variable transmission gear connecting the latter shaft with the shaft of the prime mover or motor, and means driven by the latter gear for actuating said controlling means of the prime mover or motor.

5. In means for regulating the speed of prime movers and motors, the combination, with the controlling means of the prime mover or motor, of a differential gear, a shaft driven at constant speed connected with said gear, means for varying said gear according to the condition under which said motor is to operate, a shaft adapted to be driven by said gear, a variable transmission gear connecting the latter shaft with the shaft of the prime mover or motor, and means driven by the latter gear for actuating said controlling means of the prime mover or motor.

6. In means for regulating the speed of prime movers and motors, the combination, with the controlling means of the prime mover or motor, of a variable transmission gear, a shaft driven at constant speed connected with said gear, means for varying said gear according to the condition under which said motor is to operate, a shaft adapted to be driven by said gear, a differential gear connecting the latter shaft with the shaft of the prime mover or motor, and means driven by the latter gear for actuating said controlling means of the prime mover or motor.

7. In means for regulating the speed of motors, the combination, with the controlling means of the motor, of a differential gear, a shaft driven at approximately constant speed connected with said gear, means for varying the relative movement of the elements of said gear according to the condition under which said motor is to operate, a shaft adapted to be driven by said gear, a second differential gear connecting the latter shaft with the shaft of the motor, and means driven by the latter gear for actuating said controlling means of the motor.

8. In means for regulating the speed of motors for driving mechanism, the combination, with the controller of the motor having a lever, of a differential gear, a shaft driven at approximately constant speed connected with said gear, means for varying the relative movement of the elements of said gear according to the conditions required by the driven mechanism, a shaft adapted to be driven by said gear, a second differential gear connecting the latter shaft with the shaft of the motor, and a shaft adapted to be driven by the latter gear and adapted to actuate the lever of said controller.

9. In means for regulating the speed of motors for driving mechanism, the combination, with the controlling means of the motor having a controlling lever, of a differential gear, a shaft driven at approximately constant speed connected with said gear, means for varying the relative movement of the elements of said gear according to the conditions required by the driven mechanism, a shaft adapted to be driven by said gear, a second differential gear connecting the latter shaft with the shaft of the motor, means driven by the latter gear for actuating said controlling lever, a reversing lever connected with said driven means, and a safety device for automatically returning said controlling lever into its zero position as soon as said reversing lever is returned into its zero position.

10. In means for regulating the speed of motors for driving mechanism, the combination with the controlling means of the motor having a controlling lever and a brake for the driven mechanism, of a differential gear, a shaft driven at approximately constant speed connected with said gear, means for varying the relative movement of the primary elements of said gear according to the conditions required by the driven mechanism, a shaft adapted to be driven by said gear, a second differential gear connecting the latter shaft with the shaft of the motor, means driven by the latter gear for actuating said controlling lever, a reversing lever connected with said driven means, means connected with said reversing lever for applying said brake, and a system of levers and rods, substantially as shown, connecting said latter means with said controlling lever.

11. In means of the character described for regulating prime movers and motors, the combination with a differential gear, of a constant speed auxiliary motor for driving the one primary element of same, a friction disk driven by said auxiliary motor, a friction wheel coöperating with said friction disk and adapted to be radially shifted on said disk, a shaft connected with the other primary element of said gear and adapted to be rotated by said friction wheel, a shifting rod attached to said wheel and adapted to be actuated by said prime mover or motor to shift said wheel on said disk, and a shaft connected to the secondary element of said differential gear and adapted to be driven at variable speeds resulting from the varying relative speed of said primary elements of said gear, substantially as described.

12. In means for regulating the speed of motors for driving mechanism, the combination with the controller of the motor having a lever, of a differential gear, a constant speed auxiliary motor for driving one of the primary elements of said gear, a friction disk also driven by said auxiliary motor, a friction wheel coöperating with said friction disk and adapted to be shifted radially on said disk, a shaft connected with the other primary element of said gear and adapted to be rotated by said friction wheel, a shifting rod attached to said wheel and adapted to be actuated by said driven mechanism to shift said wheel on said disk according to the conditions required by said mechanism, a controlling shaft connected to the secondary element of said differential gear to run at speeds resulting from the varying of the relative speeds of said primary elements, a second differential gear connecting said controlling shaft with the motor shaft through its primary elements, and an actuating shaft adapted to be driven by the secondary element of said second differential gear for actuating the lever of said controller.

13. In means for regulating the speed of motors for driving mechanism, the combination with the controller of the motor having a lever, of a differential gear, a constant speed auxiliary motor for driving one of the primary elements of said gear, a friction disk also driven by said auxiliary motor, a friction wheel coöperating with said friction disk and adapted to be shifted radially on said disk, a shaft connected with the other primary element of said gear and adapted to be rotated by said friction wheel, a shifting rod attached to said wheel and adapted to be actuated by said driven mechanism to shift said wheel on said disk according to the conditions required by said mechanism, a controlling shaft connected to the secondary element of said differential gear to run at speeds resulting from the varying of the relative speeds of said primary elements, a second differential gear connecting said controlling shaft with the motor shaft through its primary elements, and an actuating shaft adapted to be driven by the secondary element of said differential gear for actuating the lever of said controller, and means dependent upon the movement of said shifting rod for resetting said controller to zero after the motor has been stopped.

14. In means for regulating the speed of motors for driving mechanism, the combination with the controller of the motor having a lever, of a differential gear, a constant speed auxiliary motor for driving one of the primary elements of said gear, a friction disk also driven by said auxiliary motor, a friction wheel coöperating with said friction disk and adapted to be shifted radially on said disk, a shaft connected with the other primary element of said gear and adapted to be rotated by said friction wheel, a shifting rod attached to said wheel and adapted to be actuated by said driven mechanism to shift said wheel on said disk according to the conditions required by said mechanism, a controlling shaft connected to the secondary element of said differential gear to run at speeds resulting from the varying of the relative speeds of said primary elements, a second differential gear connecting said controlling shaft with the motor shaft through its primary elements, and an actuating shaft adapted to be driven by the secondary element of said second differential gear for actuating the lever of said controller, and a lever mechanism controlled by the movement of said shifting rod for resetting said controller to zero after the motor has been stopped.

In testimony whereof I have signed my name to this specification in the presence of two witnesses.

EDUARD MECKELBURG.

Witnesses:
  WOLDEMAR HAUPT,
  PAUL HILMERS.